July 28, 1964
P. A. REIMAN
3,142,612
METHOD OF FORMING A FIBER GLASS WATER
COALESCING MEDIA AND ARTICLE THEREOF
Filed Aug. 9, 1962
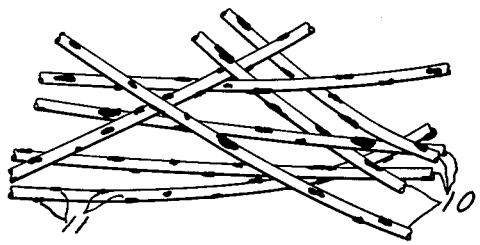
INVENTOR.
PETER A. REIMAN
BY
*Charles C. Willson*
ATTORNEY United States Patent Office 3,142,612
Patented July 28, 1964

3,142,612
METHOD OF FORMING A FIBER GLASS WATER COALESCING MEDIA AND ARTICLE THEREOF
Peter A. Reiman, Weston, Mass., assignor, by mesne assignments, to Fram Corporation, East Providence, R.I., a corporation of Rhode Island
Filed Aug. 9, 1962, Ser. No. 216,705
3 Claims. (Cl. 162—145)

This application is a continuation-in-part of application Serial No. 827,169, filed July 15, 1959, now abandoned.

Fiber glass has been used for years as a coalescing media to cause water particles finely dispersed or emulsified in a hydrocarbon liquid to coalesce into droplets of appreciable size so that they can be more readily removed from the liquid. The present invention relates to a simple method for treating such glass fibers so as to improve their water coalescing action.

Water separators are now extensively used to remove water from aviation fuel before such fuel is pumped into the tanks of airplanes, and to free oil of water. Such separators, whether used to remove water from aviation fuel or for other purposes, usually operate in two stages. The first stage employs one or more coalescers and the second stage employs one or more separators that will pass the hydrocarbon liquid but block the coalesced water particles.

The present invention provides a method for improving the performance of the fiber glass coalescers so that they will better condition or coalesce the water particles for removal by the separator media. The present coalescer media is produced from a wet-formed fibrous sheet, as distinguished from the more commonly used dry-formed glass fiber sheet.

Two-stage liquid separators that first coalesce the dispersed or emulsified water, and then block the water particles but pass the hydrocarbon liquid, may be variously constructed. One such two-stage separator is disclosed in the Robinson Patent No. 2,739,713 which describes the use of a batt of fine glass fibers as the coalescing media, and a water repellent porous paper as the separator media. In liquid separators of the general type disclosed in the Robinson patent, part of the coalesced water is removed by gravity before it reaches the water repellent separator media.

It has been common practice heretofore to treat the glass fibers that are to form the coalescer with a phenolic resin to retain the fibers in place in the fiber glass media, but such resin acts to coat the individual fibers and change their coalescing properties.

Clean glass fibers free of any resin and lubricant are hydrophilic and water in the hydrocarbon liquid will preferentially wet the surface of such fibers. On the other hand, the phenol resin has hydrophobic properties and tends to repel such water. It is now known that for best coalescing action a good balance is needed between the hydrophylic and the hydrophobic characteristics of the fibrous filter media.

This balance is needed because if clean glass fibers free of a resin and oil are used to coalesce water in a hydrocarbon liquid, the entrained water will preferentially wet such fibers and form a film on the fibers that can flow continuously through the media. It is found that as these films of water emanate on the downstream side of the coalescer they tend to come together and form droplets, but there is also a tendency for the fuel to be trapped in such droplets. In this manner large semi-coalesced globules are produced. These globules may contain appreciable amounts of the hydrocarbon liquid so that their specific gravity is very near to that of the continuous phase. This then results in poor phase separation. In addition, appreciable amounts of fuel may be associated with the separated water.

On the other hand, if the glass fibers are treated with a phenol resin in solution and subsequently cured, as is commonly done to bond the fibers together, the resin coats the individual fibers and thereby renders them hydrophobic. Coalescing in this case apparently occurs by entrapment of the dispersed water particles, and agglomeration within the fibrous media takes place. In this case continuous water films are not produced and only clean water is coalesced into droplets, but such droplets will be relatively small and the separating operation will be comparatively slow.

It will be seen from the foregoing that if fiber glass is treated with phenolic resin as above described, the coalesced water droplets will be relatively small; and if glass fibers free of such resin are used, relatively large droplets will be produced, but fuel will be trapped in these droplets.

The present invention contemplates a treatment of the glass fibers of a coalescing media so that they will produce large droplets that are free of trapped fuel. This result is secured by controlling the water wettability of the glass fibers of the coalescer.

I have found that if a nonfilm-forming water repellent resin that is not affected by the hydrocarbon liquid is precipitated on the surface of clean glass fibers in such a way that both hydrophilic and hydrophobic areas exist, it is possible to produce consistently large, clear, fuel-free, coalesced water droplets. Stated differently, if clean glass fibers which are hydrophilic have deposited thereon discrete particles of such water repellent resin so that the same is precipitated in spots on the individual fibers, the water film that forms on the clean area of the fibers will be intercepted by the discrete particles. This will interrupt the water films and prevent fuel from being trapped by such films, with the result that large fuel-free coalesced water droplets are produced that are easy to remove from the fuel.

For a disclosure of the disposition of the discrete particles of a water repellent resin on the clean glass fibers, attention is directed to the accompanying drawing which shows, on a much enlarged scale, several glass fibers 10 each having deposited thereon in spaced relation to each other the discrete particles 11. The drawing does not attempt to show the bond between the fibers formed by a resin such as vinyon. The glass fibers shown are cut or non-continuous fibers that are disposed an random to each other.

The filter media herein contemplated is, as above stated, produced from a wet-formed sheet made from glass fibers, but such a sheet will have very little inherent strength. Therefore, it is important to provide means for strengthening such glass sheet sufficiently to permit fabrication of the porous media and withstand continuous usage. This, however, should not be done by the use of a fiber-bonding resin such as phenol resin because such a resin would tend to coat the individual glass fibers and render them less hydrophilic.

Therefore I prefer to use as the bonding agent for the glass fibers thermoplastic fibers having a low melting point such, for example, as short vinyon fibers intermixed with the glass fibers so that upon the application of a moderate amount of heat the vinyon fibers will be softened sufficiently to bond the glass fibers to each other at their crossing points without appreciably coating such glass fibers. Other low-melting thermoplastic bonding fibers may be used such as polyolefin, polyamide, acrylic, polyester and cellulose acetate.

A uniform blend of the glass fibers and low-melting bonding fibers such as vinyon is easily formed by the formulation procedure carried out on paper mill equipment. Here the glass fibers, such as a mixture of different size glass fibers, and vinyon fibers in the desired proportion of each are introduced into a constantly stirred water bath to provide a wet mass that is deposited, for example, on a moving screen. When part of the water has drained off through the screen the wet web may be advanced to heated drying drums where the heat is sufficient to soften the vinyon bonding fibers. Such procedure is described in my Patent No. 3,039,914.

An important feature of the present invention, as above pointed out, resides in the depositing on the clean individual glass fibers forming the sheet discrete particles or aggregates of water repellent resin produced from polyvinyl chloride latex so that these hydrophobic particles will cover only a minor portion of the surface of the glass fibers.

This can be readily done by preparing the fiber furnish of glass and vinyon fibers ready for the paper-making operation, and then introducing a few percent of the polyvinyl chloride latex either into the machine chest or in the head box, and alum is immediately added. The latex emulsion is broken as the alum is added, resulting in the precipitation of latex particles which in most cases agglomerate to form particles appreciably larger than those originally present in the emulsion.

At this stage in the process there is a dilute dispersion of fibers and resin particles in water. Since adhesion of polyvinyl chloride to glass is poor and since the total solids within the dispersion is probably well under 1% at this stage, there is no tendency of the resin to become attached to the fibers to bond the fibers together.

As the sheet is formed on the Fourdrinier wire, the resin particles are filtered out by the forming web and are thereby trapped within the structure. After the sheet is heat dried, therefore, the result is a fibrous web containing many small discrete hydrophobic particles which are associated with and loosely adhered to the glass fiber surfaces. Because the sheet is composed at least in part of small diameter glass fibers, it is inherently a highly efficient filter. Thus, there is little or no tendency of the resin particles to migrate out of the finished medium.

The glass fiber sheet may, if desired, be reinforced by introducing with the glass fibers some strengthening fibers such as viscose rayon without reducing appreciably the advantage secured by the depositing on the glass fibers the above described discrete water repellent particles. The glass fiber sheet may be formed of what is known as AA glass, or different size glass fibers may be used. The amount of discrete water repellent particles in the finished sheet preferably is from about 1 to 10 percent of the weight of the sheet, and these particles are mechanically held in the sheet and attached to the glass fibers.

A coalescing media made from a bonded fiber glass sheet and treated as above described to provide discrete water repellent particles on the surface of the glass fibers will take advantage of the hydrophilic properties of the clean glass fibers to produce large coalesced drops of water, while the described resin particles will interrupt the water film flowing along the glass fibers to prevent such film from trapping some of the fuel. This results in the coalescing of dispersed water into oil-free droplets that are appreciably larger than obtained heretofore with resin-bonded glass fibers where the resin coated the glass fibers.

Having thus described my invention, what I claim and desire to protect by Letters Patent is:

1. The method of making an improved fiber glass water coalescing media to facilitate the removal of water from a hydrocarbon liquid, which comprises forming a slurry of glass fibers and a smaller quantity of a low melting point short thermoplastic filaments, then introducing one to ten percent of an unplasticized polyvinyl chloride latex and adding to the slurry an astringent in sufficient amount to precipitate the latex into discrete particles that will deposit on the glass fibers without producing a film thereon, forming a sheet from said slurry and drying the sheet with sufficient heat to soften said filaments to bond the fibers together at their crossing points and the discrete particles become attached to the fibers in spaced relation to each other over the length of the fibers to cover only a minor portion thereof and leave a major portion of the surface of the fibers uncoated, whereby water films that form on such fibers will be interrupted by the discrete particles and will coalesce into large clean droplets free of the hydrocarbon liquid.

2. The method of making an improved fiber glass water coalescing media to facilitate the removal of water from a hydrocarbon liquid, which comprises forming a slurry of glass fibers and a smaller quantity of short vinyon filaments, then introducing one to ten percent of an unplasticized polyvinyl chloride latex and adding to the slurry a sufficient amount of alum to precipitate the latex into discrete particles that will deposit on the glass fibers without producing a film thereon, forming a sheet from said slurry and drying the sheet with sufficient heat to soften said filaments to bond the fibers together at their crossing points and the discrete particles become attached to the fibers in spaced relation to each other over the length of the fibers to cover only a minor portion thereof and leave a major portion of the surface of the fibers uncoated, whereby water films that form on such fibers will be interrupted by the discrete particles and will coalesce into large clean droplets free of the hydrocarbon liquid.

3. An improved fiber glass water coalescing media for removing water from a hydrocarbon liquid, comprising a porous fibrous sheet formed of randomly disposed glass fibers bonded together by heat-softened randomly disposed low melting point thermoplastic filaments constituting a bond that does not coat the fibers appreciably, said fibers having deposited thereon in the sheet spaced discrete water repellent particles precipitated from polyvinyl chloride latex in quantity such that said particles constitute one to ten percent of the finished sheet weight and cover only a minor portion of the surface of the fibers and leave the major portion of the fibers clean and uncoated, whereby water films that form on such fibers will be interrupted by the discrete particles and will coalesce into large clean droplets free of the hydrocarbon liquid.

References Cited in the file of this patent

UNITED STATES PATENTS

| | | |
|---|---|---|
| 2,383,066 | McDermott | Aug. 21, 1945 |
| 2,526,125 | Francis | Oct. 17, 1950 |
| 2,568,144 | Cremer et al. | Sept. 18, 1951 |
| 2,647,851 | Schwartz | Aug. 4, 1953 |
| 2,721,139 | Arledter | Oct. 18, 1955 |
| 2,725,986 | Marvel | Dec. 6, 1955 |
| 2,797,163 | Smith et al. | June 25, 1957 |
| 2,886,466 | Iler et al. | May 12, 1959 |